(12) United States Patent
Zvonar (10) Patent No.: US 6,504,884 B1
(45) Date of Patent: Jan. 7, 2003

(54) METHOD FOR CORRECTING DC OFFSETS IN A RECEIVER

(75) Inventor: Zoran Zvonar, Boston, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/310,612

(22) Filed: May 12, 1999

(51) Int. Cl.⁷ ............................................... H04B 15/00
(52) U.S. Cl. ...................................... 375/346; 375/285
(58) Field of Search ............................... 375/346, 263, 375/285

(56) References Cited

U.S. PATENT DOCUMENTS

| | | | |
|---|---|---|---|
| 5,487,069 A | 1/1996 | O'Sullivan et al. | 370/94.3 |
| 5,610,948 A | 3/1997 | Ninomiya et al. | 375/324 |
| 5,748,677 A | 5/1998 | Kumar | 375/285 |
| 5,799,047 A * | 8/1998 | Dobrica | 375/350 |
| 6,173,011 B1 * | 1/2001 | Rey et al. | 375/233 |
| 6,269,131 B1 * | 7/2001 | Gothe et al. | 375/346 |

OTHER PUBLICATIONS

Lee et al., "Channel Estimation Based Adaptive Equalization/Diversity Combining for Time–Varying Disperse Channel", IEEE, 47th Vehicular Technology Conference, 1997, pp. 884–888.*

Razavi, "Design Considerations for Direct–Conversion Receivers", Jun. 1997, IEEE Transactions on Circuits and Systems II: Analog and Digital Signal Processing, vol. 44, No. 6, pp. 428–435.

Bateman et al, Direct Conversion Transceiver Design for Compact Low–Cost Portable Mobile Radio Terminals, May 1–3, 1989, 39th IEEE Vehicular Technology Conference, vol. I, pp. 57–62.

Sampei et al, "Adaptive DC–Offset Compensation Algorithm for Burst Mode Operated Direct Conversion Receivers" May 10–13, 1992, Proceedings of IEEE Vehicular Technology Conference, pp. 93–96.

Bergmans, "Digital Baseband Transmission and Recordings", Section 8.8.2, "Adaptive DC–Compensation", pp. 425–426.

Cavers et al, "Adaptive Compensation for Imbalance and Offset Losses in Direct Conversion Transceivers", Nov. 1993, IEEE Transactions on Vehicular Technology, vol. 42, No. 4, pp 581–588.

Lindquist et al, "A New Approach to Eliminate the DC offset in a TDMA Direct Conversion Receiver", May 18–20, 1993, Proceedings of 43rd IEEE Vehicular Technology Conference, pp. 754–757.

* cited by examiner

Primary Examiner—Chi Pham
Assistant Examiner—Dung X. Nguyen
(74) Attorney, Agent, or Firm—Samuels, Gauthier & Stevens, LLP (57) ABSTRACT

A method for reducing DC offset from a receiver signal. The method includes jointly (i.e., simultaneously) estimating such DC offset and channel impulse response, and reducing the DC offset in accordance with the estimated DC offset and the estimate of the channel impulse response.

5 Claims, 10 Drawing Sheets

METHOD FOR CORRECTING DC OFFSETS IN A RECEIVER

BACKGROUND OF THE INVENTION

This invention relates generally to radio frequency receivers and more methods for reducing DC offsets in such receivers.

As is known in the art, received radio frequency signals are converted to baseband using various receivers. With a homodyne receiver, the received radio frequency signal is mixed with the local oscillator whose frequency is equal to carrier frequency of the received radio frequency signal to translate the carrier frequency to DC and thereby provide "direct conversion" of the modulation on the received radio frequency signal to a modulation at DC. Hence, a homodyne receiver is sometimes referred to as a direct conversion receiver.

While such direct conversion receivers offer the advantage of reduced cost, DC offset associated with such receivers presents a major problem for receiver performance. More particularly, DC offset is produced from the homodyning. The level of the DC offset may be significantly larger than the desired signal, i.e., modulation, to be demodulated. Thus, DC offset compensation techniques are typically required. To insure flexibility for different operating conditions, DC offset compensation can be part of the digital baseband portion of the receiver, preferably a part of the digital signal processing (DSP) firmware. One application of direct conversion receivers is in mobile or cellular communication systems. In such systems, the radio channels received signals also suffer from intersymbol interference (ISI) caused by multipath radio propagation and. transmitter and/or receiver filtering.

More particularly, various DC offset compensation techniques, for both analog and digital domain, have been suggested. With regard to the Global System for Mobile Communications (GSM) environment, these suggested techniques are largely dependent on the sources of DC offset since they result in different levels of DC offset compared to the desired signal level. As discussed in an article entitled "Design considerations for direct-conversion receivers," by B. Rezavi, published in IEEE Transactions on circuits and systems—II: analog and digital signal processing, June 1997, pp 428–435, two major mechanisms causing DC offset in direct. conversion receivers are: Local Oscillator (LO) isolation to the receiver's Low Noise Amplifier (LNA) and mixer inputs; and interference leakage to the LO (i.e., self mixing). The level of DC offset in this case is much larger than the level of the desired signal.

Various techniques have been suggested to remove DC offset generated by these two major mechanism. Included in these techniques are: AC coupling; Offset cancellation using capacitor; Sample mean (average) estimation; Adaptive DC offset compensation for burst mode operation; and Re-integration.

AC coupling, requires high-pass filter with corner frequency 0.1% of the data rate, which is less that 270 Hz for GSM. Problems associated with this approach are elimination of signal content around DC, group delay characteristic of the filter and settling time in Time Division Multiple Access (TDMA) environment.

With offset cancellation using a capacitor for TDMA systems, the offset in the receive path can be stored on a capacitor during the idle mode and subtracted from the signal during actual reception in the burst. The major issues with this technique are kT/C noise and problems when interferer is stored along with other offsets.

With the sample mean (average) estimation based technique, such technique includes averaging over sufficiently long period and subtraction, as described by A. Bateman and D. Haines, in "Direct conversion transceiver design for compact low-cost portable mobile radio terminals," in Proc. VTC'89, pp 57–62. In TDMA systems, averaging is usually performed over the burst duration. The issues associated with this approach are: it does not address DC offset changes within burst; and it may introduce some bias since burst does not have zero DC component due to different number of zeros and ones in the data stream. Besides its simplicity this method has some desirable statistical properties. Sample mean estimate is optimal DC offset estimate in zero-mean noise with Gaussian probability density function in minimum mean-squared error sense (also minimum variance unbiased estimate) and maximum likelihood sense. Even when the probability density function (pdf) of the noise is not known, the signal average is the best linear unbiased estimate, see *Fundamentals of statistical signal processing: estimation theory,* Prentice Hall, 1993 by S. Kay.

Adaptive DC offset compensation for burst mode operation is presented in a paper entitled "Adaptive DC offset compensation algorithm for burst mode operated direct conversion receivers," by S. Sampei and K. Feher, Proc. VTC'92, pp 93–96. This approach utilizes the known bits from the preamble to acquire DC offset, typically 3–5 bits. Simulations have shown that the technique is efficient in the cases where the DC offset ratio (amplitude ratio of DC offset to the maximum amplitude of the transmitted symbol) is less than 40%. Degradation of the performance is up to 1.5 dB. A similar approach has been presented by J. Bergmans, *Digital baseband transmission and recording,* Kluwer Academic Publishers, Section 8.8.2. in a more general communication scenario of continuous reception. In essence it is a form of dynamic loop tracking DC offset.

Digital compensation based on Least Mean Square (LMS) adaptive algorithm has been presented in by J. Cavers and M. Liao, in "Adaptive compensation for imbalance and offset losses in direct conversion receivers," IEEE Transactions on Vehicular Technology, November 93, pp 581–588. Such paper describes models and theoretical development of receiver and transmitter compensation (modulator and demodulator). The least mean square (LMS) algorithm has been applied to set the parameters of the compensating circuit (compensates for In-Phase (I) and Quadrature (Q) gain and phase imbalance and DC offset). Effectively the system has three adaptive coefficients. A drawback of the algorithm is the long convergence time and sensitivity to the selection of LMS step-size parameters.

The re-integration approach is presented in a paper by B. Lindquist, M. Isberg and P.Dent, entitled "A new approach to eliminate the DC offset in a TDMA direct conversion receiver," In Proc. VTC'93, pp 754–757[7]. The idea is to differentiate signal, digitize it and then re-integrate, thus eliminating DC component. It is based on adaptive delta modulation and since there is no time constant it targets TDMA direct conversion receivers. Simulation results presented in the paper indicate signal to noise ratio (SNR) degradation of 1 dB in static channel for the Bit Error Rate (BER) range 1% to 0.1%.

Figure 1:
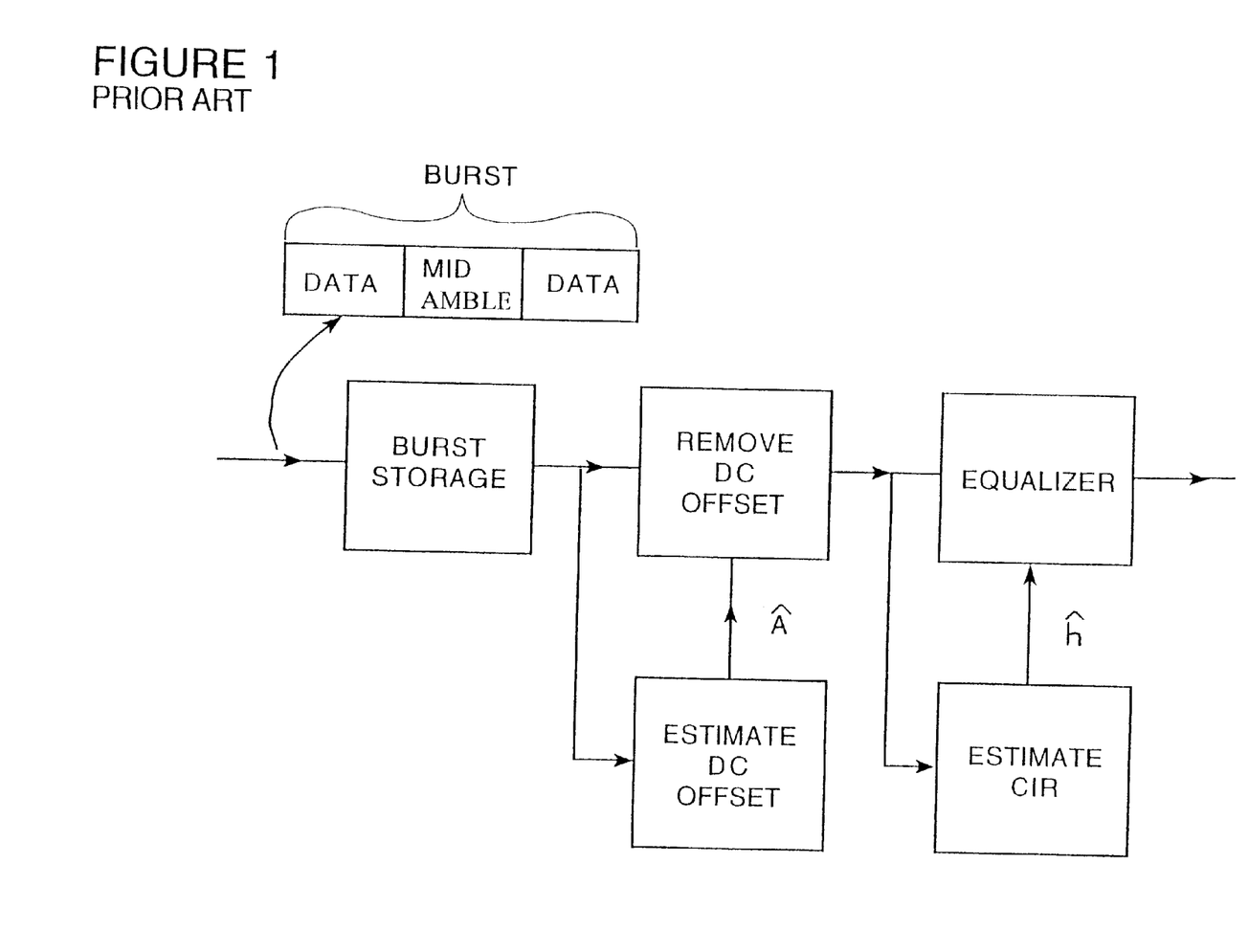
FIG. 1 is a block diagram of a data receiver in accordance with the PRIOR ART.

In a GSM system, the whole burst is stored and the all-digital techniques described above may be adapted to extract DC offset. Thus, referring to FIG. 1, the data receiver stores the burst of data, r(k), where k=1 ... N and N is the number of samples in the burst. Each burst includes a mid-amble having a known sequence of bits disposed between data, (i.e., information bits) as shown. Such known sequence of bits is used to aid in equalization and more particularly for enabling computation of the channel impulse response (CIR). As shown in FIG. 1, an estimate of the DC offset, Â, is calculated. The estimated DC offset, Â, where k=1 ... N, is subtracted from the received burst. The result, r(k)−Â, where k=1 ... N, is processed to find an estimate of the channel impulse response (CIR), ĥ. The estimate of the channel impulse response (CIR), ĥ, can be obtained by cross-correlating [r(k)−Â] with the known mid-amble bit sequence.

The complexity of the DC offset cancellation in GSM system is related to other signal processing functions performed in baseband (synchronization, equalization). Residual DC offset may affect the performance of data receiver.

SUMMARY OF THE INVENTION

In accordance with the present invention, a method is provided for reducing DC offset from a received signal. The method includes jointly estimating such DC offset and a channel impulse response, ĥ, and reducing the DC offset in accordance with the estimated DC offset and the estimated channel impulse response, ĥ.

In accordance with another feature of the invention, a communication system is provided wherein information is transmitted through a channel having a discrete channel impulse response h(k), where k is a time index, to produce at an output of the channel, a signal, r(k), where:

$$r(k) = A + \sum_n b(n)h(k-n) + N(k)$$

where:

A is DC offset;

$$\sum_n b(n)h(k-n)$$

is a modulated signal transmitted over the channel 42;

b(n) are transmitted data symbols; and

N(k) is additive noise.

The system includes a receiver for receiving the transmitted information. The receiver has a processor programmed to solve the following equations simultaneously:

$$\frac{\partial f(e(k))}{\partial \hat{A}} = 0$$

$$\frac{\partial f(e(k))}{\partial \hat{h}} = 0$$

where:

f(e(k)) is a function, usually quadratic, of the estimation error, e(k), where e(k) is the difference between the received signal and an estimate of the received signal; i.e., $$e(k) = r(k) - \hat{A} - \sum_n \left[b(n)\hat{h}(k-n)\right]$$

In accordance with another feature of the invention, a communication system is provided wherein information is transmitted through a channel as a series of bursts, each burst having a predetermined series of bits and a series of information bits. The system includes a receiver for receiving the transmitted information. The receiver has a processor programmed to simultaneously solve the following equations from: (a) the predetermined series of bits; (b) a tentative decision of the information bits; or, a combination of the predetermined series of bits and the tentative decision of the information bits:

$$\frac{\partial f(e(k))}{\partial \hat{A}} = 0$$

$$\frac{\partial f(e(k))}{\partial \hat{h}} = 0$$

where:

f(e(k)) is a function, usually quadratic, of the estimation error, e(k), where e(k) is the difference between the received signal and an estimate of the received signal; i.e., $$e(k) = r(k) - \hat{A} - \sum_n \left[b(n)\hat{h}(k-n)\right]$$

BRIEF DESCRIPTION OF THE DRAWINGS

These and other features of the invention will become more readily apparent from the following detailed description when taken together with the following drawings, in which.

DESCRIPTION OF THE PREFERRED EMBODIMENTS

Figure 2:
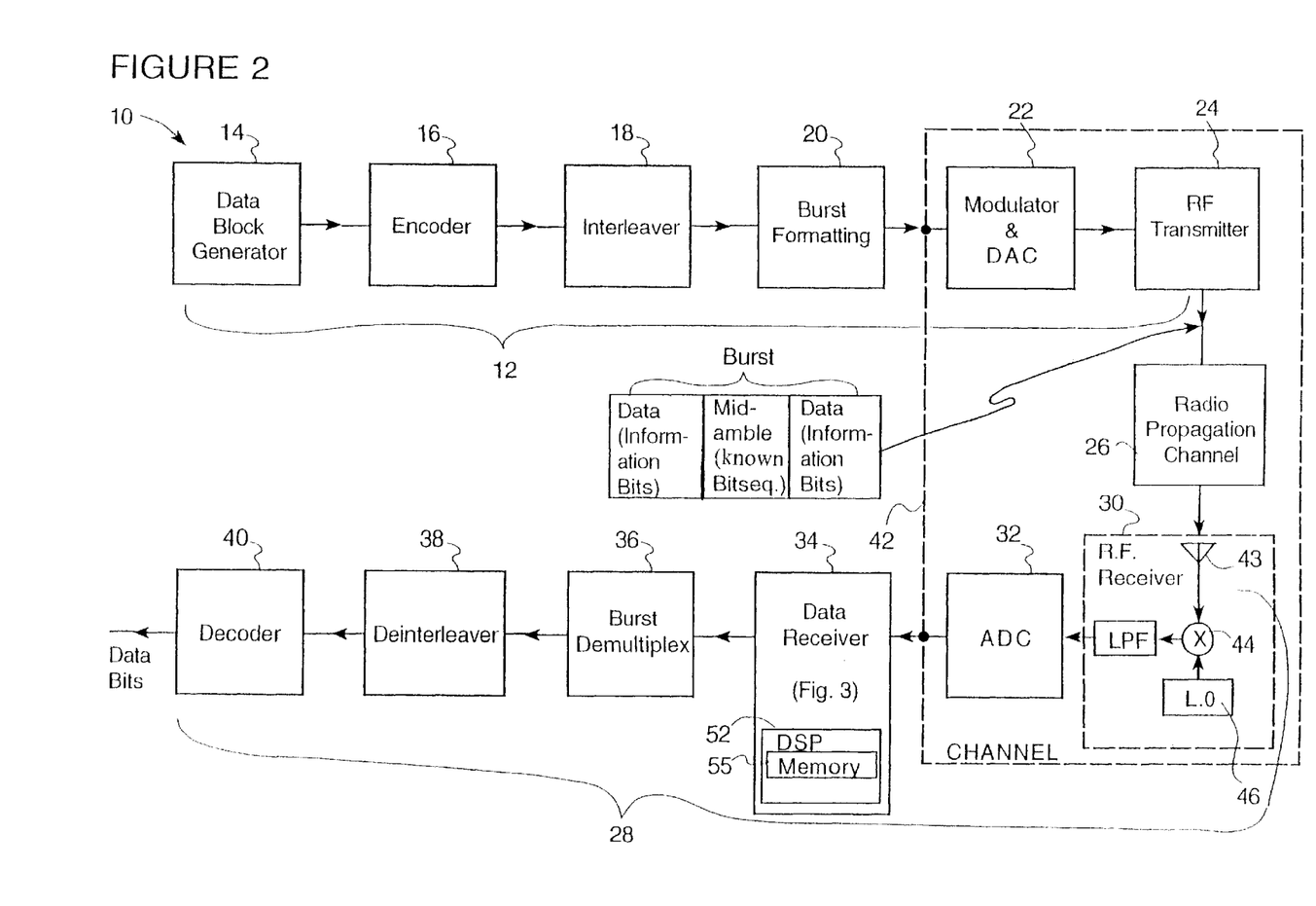
FIG. 2 is a block diagram of a radio communication system according to the invention.

Referring now to FIG. 2, a block diagram of a communication system 10, here a TDMA communication system is shown to include a transmitter, here represented by a transmitter 12 for producing a radio frequency carrier modulated by bursts of data bits. Each burst includes a known sequence of bits and a series of unknown, here information, bits. Such known sequence of bits is used to aid in equalization and more particularly for enabling computation of the channel impulse response (CIR). For example, with a GSM, each burst includes a mid-amble having a known sequence of bits interposed between a pair of series of information, bits. Here, the mid-amble is used in a manner to be described to reduce DC offset from a receiver signal by jointly estimating such DC offset and the channel impulse response, and reducing the DC offset in accordance with the estimated DC offset and the estimated channel impulse response.

More particularly, the information, after passing through a data block generator 14, interleaver 18, burst formatter 20, modulator and analog to digital converter (ADC) 22 is transmitted by a transmitter 24 through space (i.e., a radio propagation channel 26) to a receiver 28. More particularly, the receiver 28 is a direct conversion receiver having a homodyning receive section 30, an ADC 32, a data receiver 34 (to be described in detail in FIG. 3), a burst demodulator 36, a de-interleaver 38, and a decoder 40. It is noted that a channel 42 is thereby provided between the output of the burst formatter 20 and the output of ADC 32. Such channel 42 may be characterized by a discrete impulse response h(k), where k is a time index.

The receive section 30 includes an antenna 43 for receiving the transmitted radio frequency signal having a carrier frequency $f_0$. The radio frequency signal carrier is modulated with desired data at the transmitter, in any conventional manner. Here, the receiver is used in a Time Domain Multiple Access (TDMA) system. The antenna 43 is fed to a mixer 44, as shown. Also fed to the mixer 44 is a local oscillator signal produced by local oscillator (LO) generator 46. Here, the frequency of the signal produced by the local oscillator is also $f_0$. The output of mixer 44 is passed through low pass filter 48 to remove higher-order harmonics from the mixing process. The resulting baseband signal, here a train of bursts, produced at the output of the low pass filter is fed to the analog to digital converter (ADC) 32 where the modulation is converted to corresponding digital data. The data is processed in the data receiver 34 which includes a Digital Signal Processor (DSP), as indicated.

Figure 3:
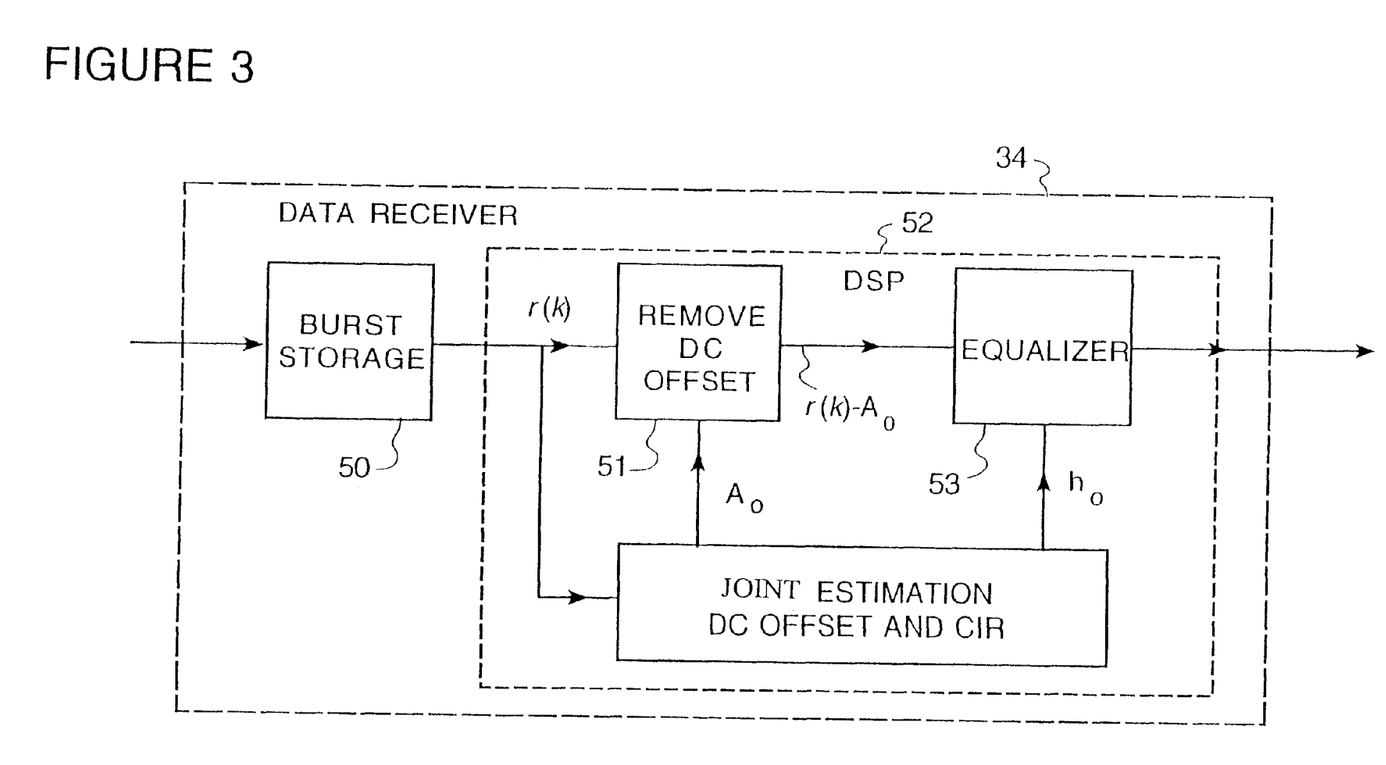
FIG. 3 is a block diagram of a data receiver used in the radio communication system of FIG. 2 according to the invention.

Referring to FIG. 3, the data receiver 34 is shown to include a burst storage, or memory, 50, used by a DSP 52 to remove the DC offset from the burst, and to provide equalization which is assisted by a joint estimate of both the DC offset, Â, and the channel impulse response, ĥ. In order to understand the process used to remove the DC offset, A, let it first be assumed that dynamic range of the converter is large enough to accommodate both DC offset and the desired signal (i.e., the modulation at baseband), and that the sampled version of the complex baseband signal at the output of the analog to digital converter (ADC) 34 can be represented as:

$$r(k) = A + \sum_n b(n)h(k-n) + N(k)$$

where:

A is the DC offset;

$$\sum_n b(n)h(k-n)$$

is the modulated signal received by the ADC;

k is a time index;

b(n) are data symbols;

h(k) is the impulse response of channel 42 (i.e., from transmitter baseband to receiver baseband) and includes the modulator 22, the transmitter 24, the radio propagation channel 26, the R. F. receiver 30 and ADC 32; and N(k) is additive noise.

This formulation is quite general since it captures complex (i.e., In-Phase (I) and Quadrature (Q)) signal.

The received signal includes three terms: (1) the DC offset; (2) the signal passed through the channel 42, i.e., the modulated signal; and (3) thermal noise. Intuitively, if we are able to remove effect of modulated signal, we will reduce overall noise in the process of DC offset estimation.

The problem can be formulated as joint estimation problem of unknown DC offset and channel 42 coefficients which represent the estimate of the channel impulse response. Such channel 42 coefficients are required for the data receiver 34 equalizer 53 (FIG. 3) provided by the DSP 52. That is, we want to minimize a function of the error e(k) with respect to the estimated DC offset, Â, simultaneously with the minimizing the error e(k) with respect to the channel impulse response, ĥ, where e(k) is a function of the actual received modulated signal, r(k), and the estimated modulated signal, r̂, where k is the Lime index. That is, the DC offset and channel impulse response are jointly estimate. In order to perform this joint minimization of f(e), were solve the following two equations simultaneously:

$$\frac{\partial f(e(k))}{\partial \hat{A}} = 0$$

$$\frac{\partial f(e(k))}{\partial \hat{h}} = 0$$

$$e(k) = r(k) - \hat{A} - \sum_n [b(n)\hat{h}(k-n)]$$

In a GSM system, for example, we constrain the estimate of ĥ to a channel length to 5 coefficients based on physical channel profiles. In that case, the received signal can be expressed in the vector form, where the symbols: *; T; and, H are for conjugate, transpose and Hermitian (conjugate and transpose) respectively:

$$r(k) = A + \vec{h}^H \vec{b}(k) + N(k)$$

where:

→ represents a vector; and $$\vec{h} = [h_0 \ldots h_L]^T$$

is the channel vector of length (L+1) assumed to be fixed within a burst, and the corresponding data vector is $$\vec{b}(k) = [b(k) \ldots b(k-L)]^T$$

Here, f(e(k)) is the Minimum Mean Square Error function. The optimization criterion is the Minimum Mean-Squared Error (MMSE), where symbol E{ } denotes statistical average.

$$\min_{A,\vec{h}} E\{|e(k)|^2\},$$

$$e(k) = r(k) - A - \vec{h}^H \vec{b}(k) - N(k)$$

Differentiating with respect to the DC offset value and the estimated channel impulse response and equating the obtained gradients to zero the coupled system of equations is obtained. That is:

$$\frac{\partial E|e(k)|^2}{\partial \vec{h}} = 0$$

$$\frac{\partial E|e(k)|^2}{\partial A} = 0$$

The simultaneous solution results in:

$$A_0 = E\{r(k) - \vec{h}_0^H \vec{b}(k)\}$$

$$\vec{h}_0 = E\{\vec{b}(k)\vec{b}^H(k)\}^{-1} E\{\vec{b}(k)[r(k) - A_0]^*\}$$

These equations provide optimal solution in MMSE sense (It is important to note that using maximum likelihood criterion we would obtain the same solution since the additive noise is assumed to have Gaussian distribution).

The following should be noted: Provided that we have a statistical average (which is not the case in practice and which will be addressed later), the solution is intuitive: DC offset is calculated by averaging over the received samples once the channel impact is removed and the estimated channel impulse response (i.e, coefficients) are obtained after removing DC offset from received samples. Because the equations are cross-coupled, we have to start the iterative process, i.e. estimate one of the parameters first and then proceed with the computation having in mind that DC offset can be much larger than the desired signal. An initial estimate of the DC offset can be average over received samples neglecting the channel impact. This is also intuitive: The statistical average of the modulated signal, here, for example, a Gaussian Minimum Shift Keying (GMSK) received signal, is zero. In addition we can approximate desired signal passed through fading channel as Gaussian distributed (channel coefficients of fading channel are complex Gaussian in European Telecommunication Standard Institute (ETSI) models). In that case, the optimal DC offset estimate in the zero-mean noise with Gaussian probability density function (pdf) is given by received signal average, which is optimal in MMSE and in the maximum likelihood sense. Even when pdf of noise is not known, the signal average is best linear unbiased estimate. The timing estimate within the burst has to be calculated. Because it is extracted from mid-amble portion, it should be performed after DC offset removal.

Since the statistical average is not available in practical system due to finite length of received samples (GSM burst), there are several approaches to implement the optimal solution. All of them are based on certain approximation of the statistical averaging operator.

General Solution

Figure 4:
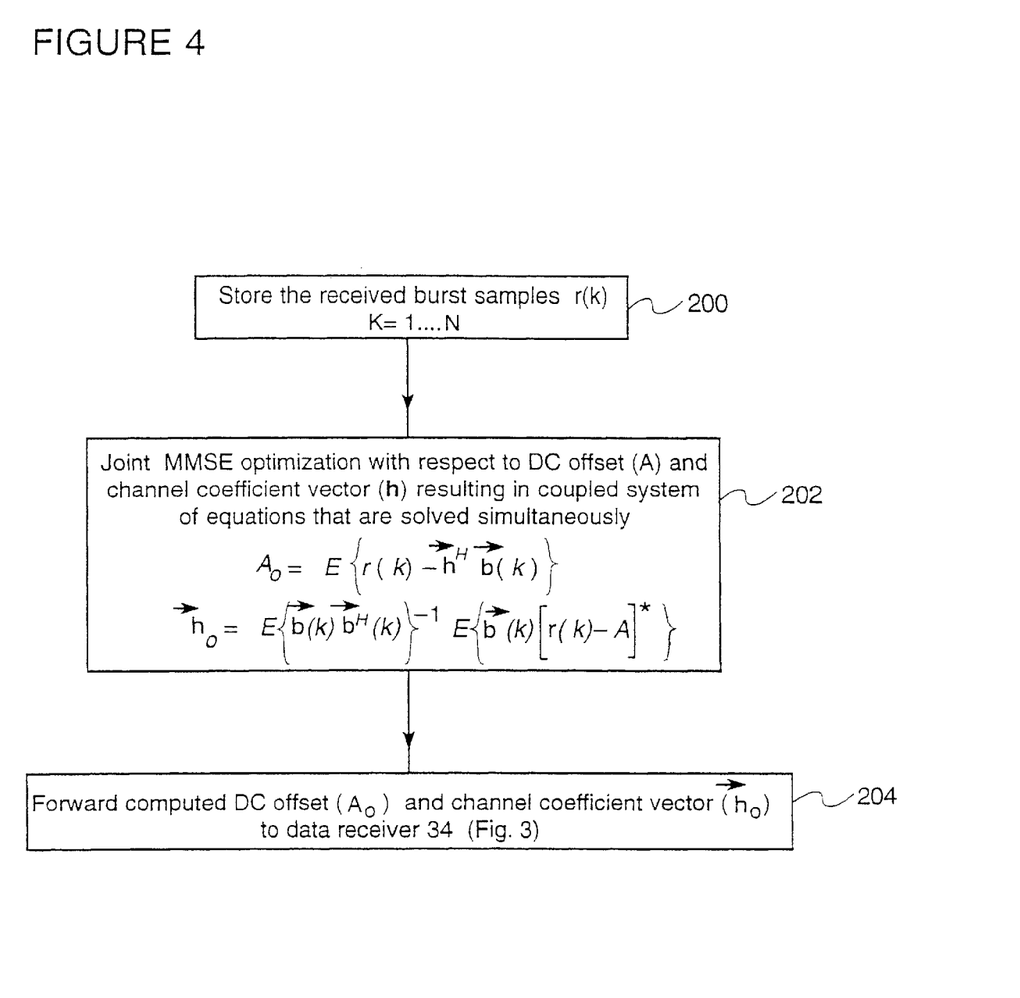
FIG. 4 is a flowchart showing the process used to jointly estimate DC offset and the channel impulse response for the system of FIG. 2 according to the invention.

The process for reducing DC offset from a direct conversion receiver signal is performed by jointly estimating such DC offset and channel impulse response (i.e. coefficients representing channel 42 (FIG. 2)) and reducing the DC offset in accordance with the estimated DC offset and estimated channel impulse response. More particularly, referring to FIG. 4, the DSP 52 is programmed by a memory in the DSP 52 in accordance with the flowchart shown in FIG. 4, to perform the following method on the received signal, r(k). In step 100, the received burst samples, r(k) are stored in a memory 55 of the DSP 52. Next, in step 102, a joint, i.e., simultaneous, Minimum Mean Square Error optimization with respect to the DC offset, A, and channel impulse response (i.e., coefficient vector, $\vec{h}(k)$), is performed resulting in a coupled system of equations that are solved simultaneously:

$$A_0 = E\{r(k) - \vec{h}_0^H \vec{b}(k)\}$$

$$\vec{h}_0 = E\{\vec{b}(k)\vec{b}^H(k)\}^{-1} E\{\vec{b}(k)[r(k) - A_0]^*\}$$

Next, in step 104, the computed DC offset, $A_0$, and the computed channel impulse response, $\vec{h}_0$, (i.e., coefficient vector ($\vec{h}_0$)) are forwarded to the data receiver 34, FIG. 3.

Thus, referring to FIG. 3, the stored r(k) has the DC offset thereof, A, removed by subtracting the computed DC offset, $A_0$, from the stored r(k) in subtractor 51 to produce the signal r(k)–$A_0$. The signal, r(k)–$A_0$, is fed to equalizer 53 along with the computed channel impulse response, $\vec{h}_0$, to aid in equalization and ISI reduction.

Adaptive Solution Based on LMS

Having the gradient of the solution, we can replace the statistical average by single point approximation. In that case, an adaptive algorithm for joint estimation can be summarized as:

1. Calculate initial values:

$$A(0) = \frac{1}{N} \sum_{k=1}^{N} r(k)$$

and

N being the number of samples required for averaging (up to burst length).

2. Subtract A(0) from received samples and extract timing

3. For n=0, 1, 2 . . .

$$e(n) = r(n) - \vec{h}^H(n)\vec{b}(n) - A(n)$$

$$A(n+1) = A(n) + \mu e(n)$$

$$\vec{h}(n+1) = \vec{h}(n) + \mu \vec{b}(n) e^*(n)$$

4. Subtract the DC offset value from received samples for further processing, where $\mu$ is the Least Mean Square (LMS) step-size parameter determined for each specific system being designed though simulation of the system. From the computational point of view, this solution is very simple. It requires only one inner product in error calculation. A potential problem for the LMS solution is the long convergence time, which can be much higher than mid-amble length. Therefore, we have to rely on tentative decisions feedback from receiver equalizer 53 (FIG. 3). On the other hand, the adaptive solution could track slow changes in the DC offset and the channel response within the burst.

Figure 5:
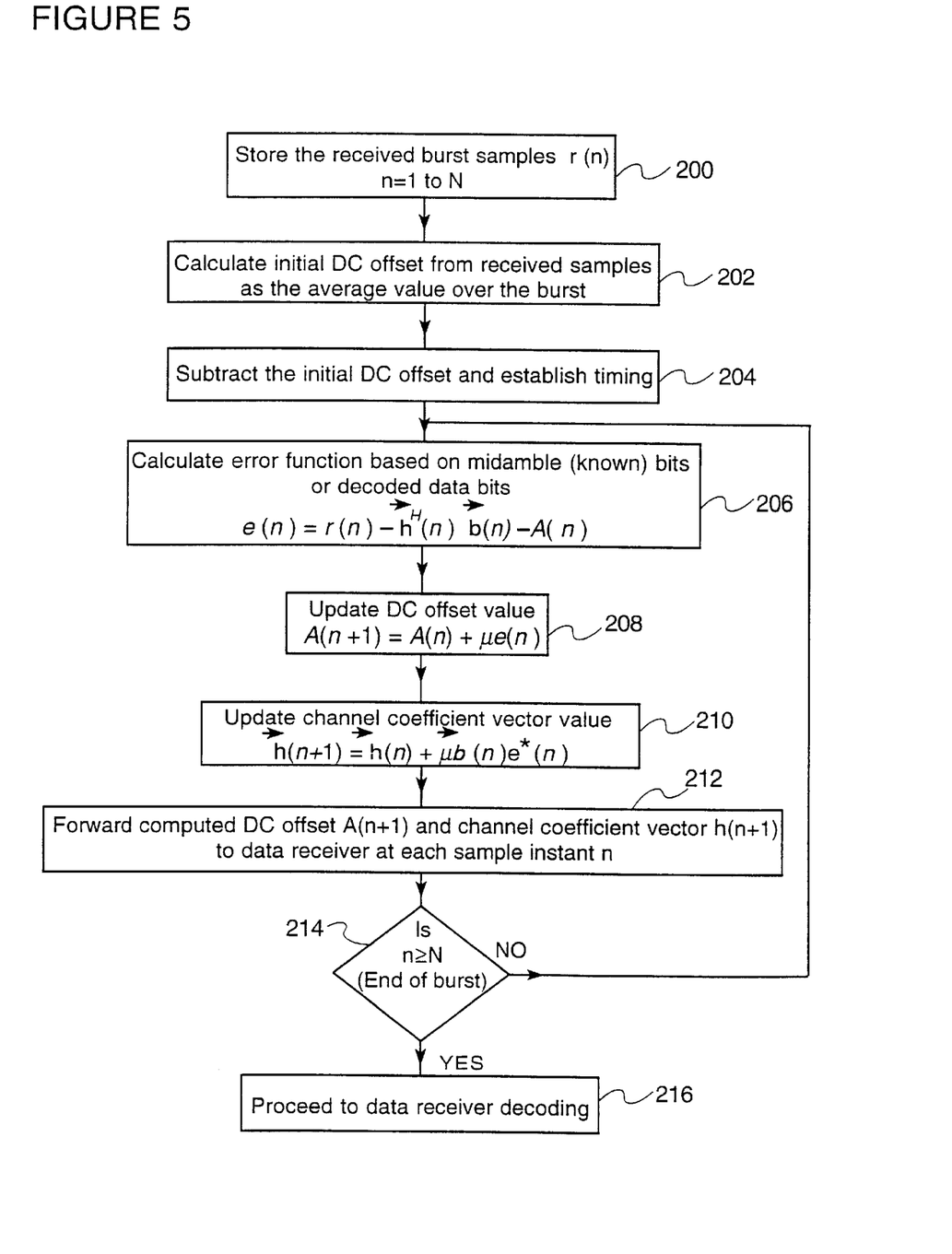
FIG. 5 is a flowchart showing the process used to jointly estimate DC offset and the channel impulse response for the system of FIG. 2 based on Least Mean Square error, sample by sample over a burst duration according to one embodiment of the invention.

Thus, referring to FIG. 5, the DSP 52 is programmed by a memory stored in the DSP 52 in accordance with the flowchart shown in FIG. 5, to perform the following method on the received signal, r(k):

In step 200, the received burst samples, r(n), where n goes from 1 to N, are stored in a memory provided in the DSP 52. In the next step, 202, an initial DC offset, A(0), is calculated from the received samples as the average value over the burst. In the next step 204, the initial DC offset, A(0), is subtracted from the received burst, r(n), where n=1 . . . N, (i.e., r(n)−A(0)). In the next step 206, an error function, $e(n) = r(n) - \vec{h}^H(n)\vec{b}(n) - A(n)$ is calculated. In the next step 208, an update of the DC offset value, $A(n+1) = A(n) + \mu e(n)$ is performed. In the next step 210, an update the channel impulse response (i.e., coefficient vector value) $\vec{h}(n+1) = \vec{h}(n) + \mu \vec{b}(n)e^*(n)$ is performed. In the next step 212, the computed DC offset A(n+1) and channel impulse response (i.e., coefficient vector) h(n+1) are forwarded to the data receiver 34 at each sample instant n. The process returns to step 206 until the end of the burst, step 214. When the burst is ended, the DSP 52 proceeds to data receiver 34 and decoding (i.e., decoder 40, FIG. 2), step 216.

Another possibility for the adaptive solution is to employ Recursive Least-Squares (RLS), however it is more computationally intensive.

Least-Squares Solution

Figure 6:
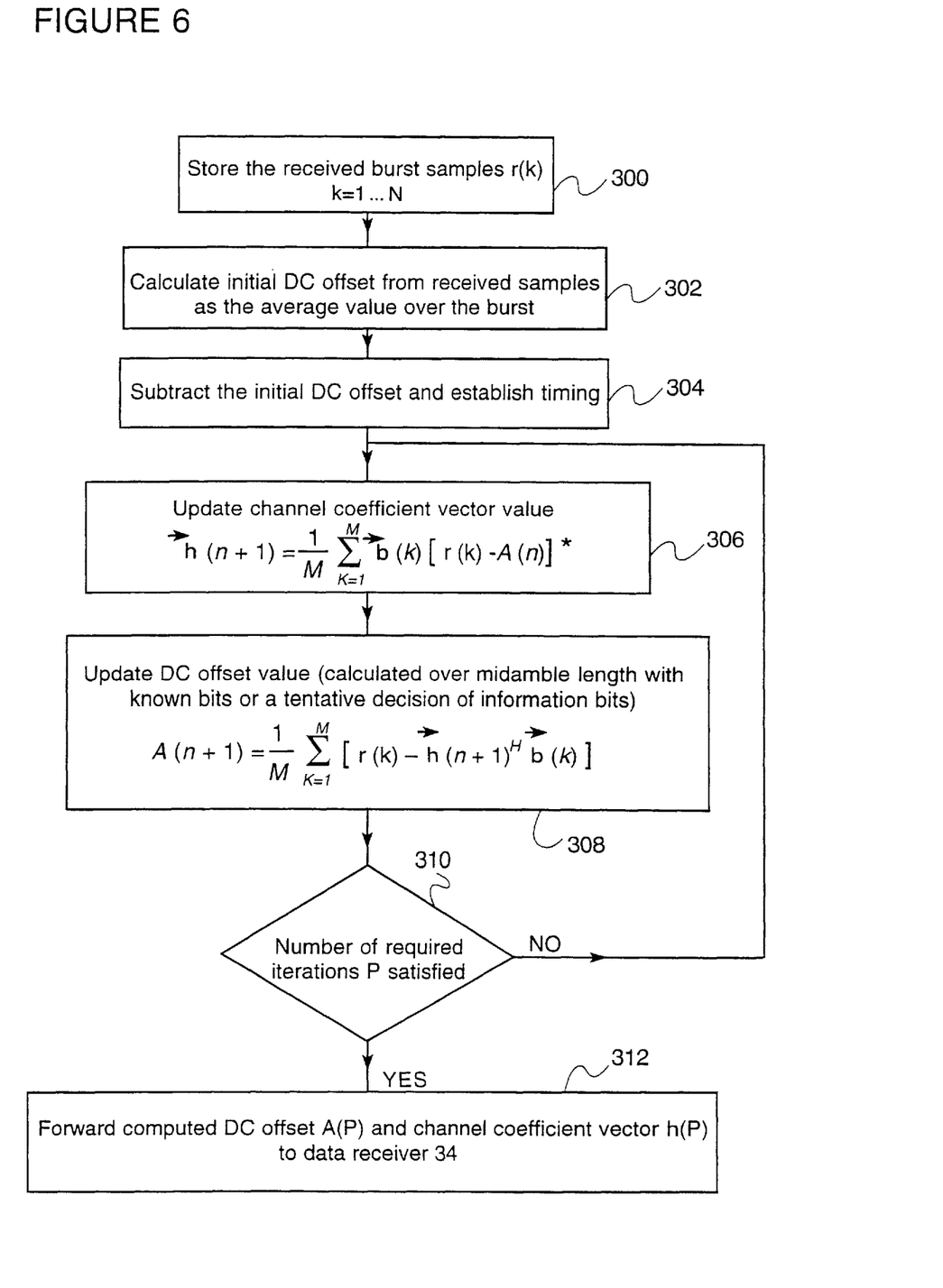
FIG. 6 is a flowchart showing the process used to jointly estimate DC offset and the channel impulse response for the system of FIG. 2 based on Least Square Error, by processing over an entire burst in a specified number of iterations, according to another embodiment of the invention.

The solution using the deterministic criterion of least-squares has the same form as the optimal MMSE solution except that the statistical average is replaced by a time average. Again, it is important to note that the DSP 52 is programmed to simultaneously solve the equations:

$$\frac{\partial f(e(k))}{\partial \hat{A}} = 0$$

$$\frac{\partial f(e(k))}{\partial \hat{h}} = 0$$

described above from: (a) the predetermined series of bits; (b) a tentative decision of the information bits; or, a combination of the predetermined series of bits and the tentative decision of the information bits.

The Least-squares solution can be summarized as:
1. Calculate initial value $$A(0) = \frac{1}{N}\sum_{k=1}^{N} r(k)$$

N being the number of samples required for averaging (up to burst length, N, to be determined by simulation);

2. Subtract A(0) from received samples and extract timing;
3. For n=0, 1, 2 . . . calculate iterative solution $$\vec{h}(n+1) = \left(\frac{1}{M}\sum_{k=1}^{M}\vec{b}(k)\vec{b}^H(k)\right)^{-1} \frac{1}{M}\sum_{k=1}^{M}\vec{b}(k)[r(k) - A(n)]^* =$$

$$\frac{1}{M}\sum_{k=1}^{M}\vec{b}(k)[r(k) - A(n)]$$

$$A(n+1) = \frac{1}{M}\sum_{k=1}^{M}\left[r(k) - \vec{h}(n+1)^H\vec{b}(k)\right]$$

The DC offset estimate, A(n+1), can be calculated over the mid-amble length or entire burst length, N; and 4. Subtract the final DC offset value from received samples for further processing.

It is important to note that the index n in iterations does not correspond to time index as in LMS solution, but rather it corresponds to the iteration step. Matrix inversion is avoided due to cross-correlation properties of the mid-amble in the GSM system, so that the channel estimate is a simple cross-correlation with known bit sequence. The number of iterations required has to be determined via simulation.

Thus, referring to FIG. 6, the DSP 52 is programmed by a memory stored in the DSP 52 in accordance with the flowchart shown in FIG. 6, to perform the following method on the received signal, r(k):

In step 300, the received burst samples, r(k), are stored in a memory provided in the DSP 52. In the next step, 302, an initial DC offset, A(0), is calculated from the received samples as the average value over the burst. In the next step 304, the initial DC offset, A(0), is subtracted from the received burst. In the next step 306, the channel impulse response (coefficient vector value)

$$\vec{h}(n+1) = \frac{1}{M}\sum_{k=1}^{M}\vec{b}(k)\,[r(k) - A(n)]^*$$

are updated. In the next step 308, the DC offset value (calculated over the mid-amble length with known bits or the over the whole burst with decoded bits, i.e., a tentative decision of the information bits)

$$A(n+1) = \frac{1}{M}\sum_{k=1}^{M}\left[r(k) - \vec{h}(n+1)^H\vec{b}(k)\right]$$

are updated. In the next step 310, a determination is made as to whether the number of required iterations, P, been performed (i.e., have the number of required iterations, P, been performed? If not, the process continues to update the estimated channel impulse response (i.e., coefficients) and DC offset values, the process returns to step 306; if it has, the computed DC offset A(P) and channel impulse response (coefficient) vector $\vec{h}(P)$ is forwarded to the channel receiver, step 312.

Simulation Results

Figure 7:
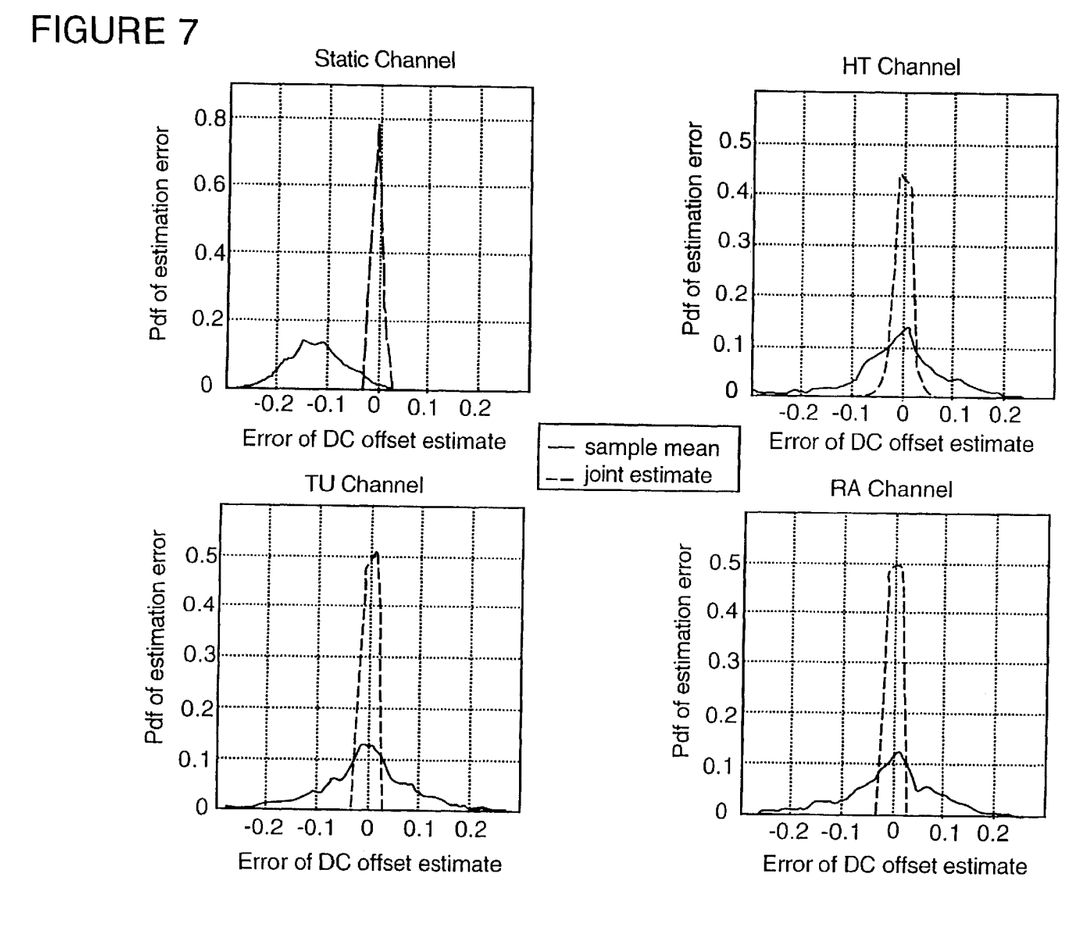
FIG. 7 shows the probability density function (pdf) estimate of the DC offset estimation error for high signal-to-noise ratio (SNR), i.e., with no noise, according to the PRIOR ART (i.e., "sample mean") and according to the invention (i.e., "joint estimate") performed over the entire burst.
Figure 8:
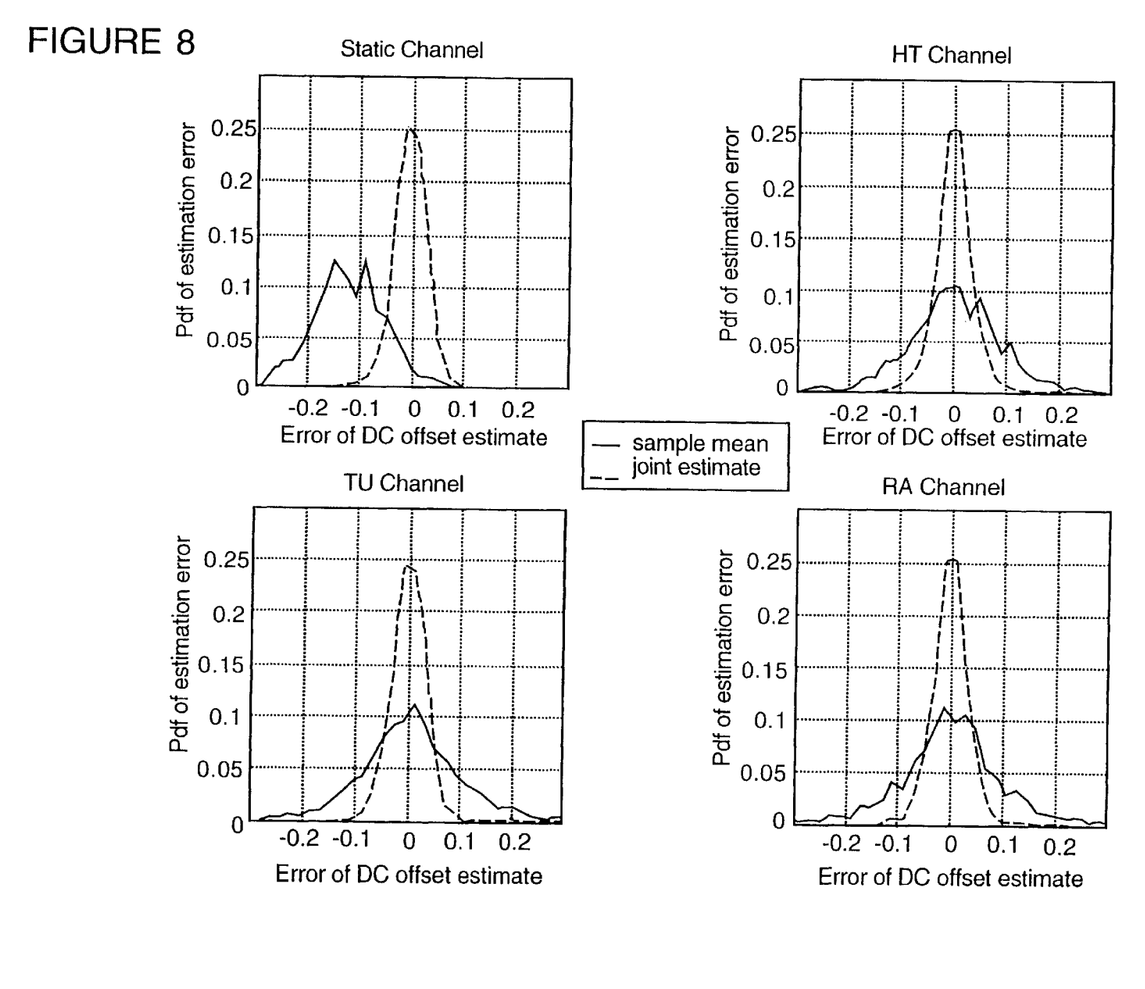
FIG. 8 shows the probability density function (pdf) estimate of the DC offset estimation error for a SNR=8 db, for both the PRIOR ART method and in accordance with the invention over the entire burst.
Figure 9:
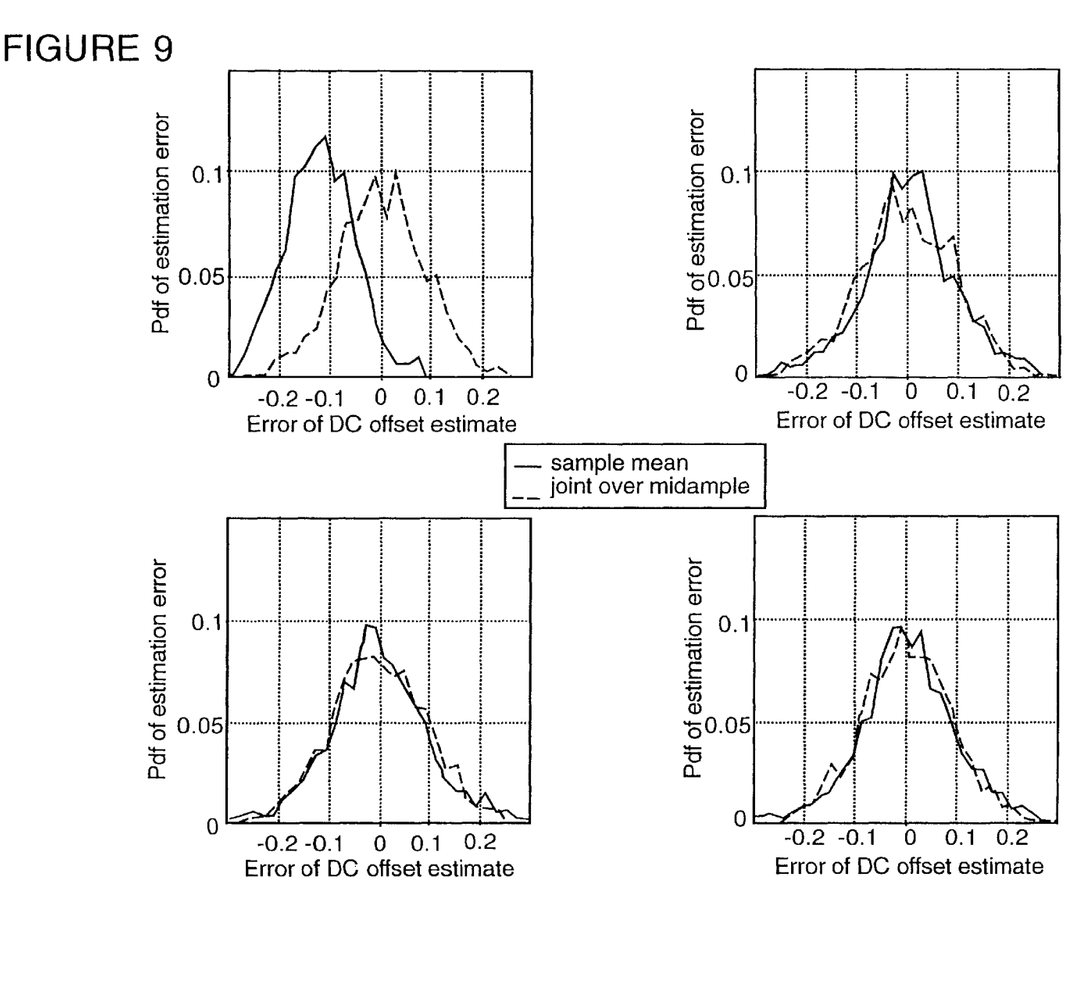
FIG. 9 shows the probability density function (pdf) estimate of the DC offset estimation error for a SNR=8 db, for both the PRIOR ART method and in accordance with the invention over the mid-amble portion of the burst.

To quantify the performance improvement obtained by performing joint estimation of DC offset and channel impulse response (i.e., coefficients), simulations have been carried out. The first set of simulations in Matlab compares the probability density functions of the DC offset estimation error for sample mean estimator and joint estimator. The estimation error has been analyzed over a 1000 burst using a quasi-static channel modeling (fixed fading channel coefficients during the burst) and applying serial receiver analysis where DC offset has been added to the In-phase component of the signal after the signal de-rotation. Two scenarios have been analyzed: a high SNR (no noise) case and a low SNR=8 dB, and the results have been presented in FIGS. 7, 8, and 9 and TABLES I and II, below.

TABLE I

Statistical parameters of DC offset estimation error for sample mean – averaging estimator (AE) and joint estimator (JE) performed over the whole burst N (JE – N) for high SNR (no noise)

|  | Static | TU | HT | RA |
| --- | --- | --- | --- | --- |
| Mean – AE | 0.12 | 0.001 | 0.002 | 0.0016 |
| Std – AE | 0.075 | 0.1 | 0.1 | 0.1 |
| Mean – JE – N | 0.004 | 1e–4 | 2e–4 | 6e–5 |
| Std – JE – N | 0.045 | 0.045 | 0.05 | 0.045 | where Static refers to a direct connection in place of antennas for the radio propagation channel 26 (FIG. 2); RA is Rural Area; TU is Typical Urban Area; and, HT is Hilly Terrain, as defined by the ETSI. Further, "Mean" refers to statistical mean and Std refers to standard deviation. In high SNR case joint estimation eliminates the bias component of the DC offset residual in static channel, which is direct consequence of the modulated signal presence. At the same time in all channel conditions it reduced the variance of the estimate. The reduction in standard variation is about two times as quantified in Table I.

In low SNR case standard deviation of both estimators is higher due to additional thermal noise. Joint estimator performed over the burst length eliminates bias for he static channel and reduces standard deviation by a factor of two as quantified in Table II. When joint estimation is performed over midamble length to reduce the computational complexity a few observations can be made. In all channel conditions standard deviation of the estimate has been larger since the sample size is smaller (midamble length versus whole burst). In static channel residual DC offset is eliminated, while variance is comparable to the sample mean case. In fading channels residual DC offset is two times smaller and standard deviation is 10% smaller when. using joint estimation.

TABLE II

Statistical parameters of DC offset estimation error for sample mean – averaging estimator (AE) and joint estimator (JE) performed over the whole burst N (JE – N) and the joint estimator performed over the mid-amble length M (JE – M). for SNR = 8 dB

|  | Static | TU | HT | RA |
| --- | --- | --- | --- | --- |
| Mean – AE | 0.12 | 0.004 | 0.003 | 0.004 |
| Std – AE | 0.08 | 0.11 | 0.11 | 0.11 |
| Mean – JE – N | 0.005 | 4e–4 | 4e–4 | 9e–5 |
| Std – JE – N | .055 | .054 | .056 | .055 |
| Mean – JE – M | .0001 | .002 | .001 | .001 |
| Std – JE – M | 0.097 | 0.1 | 0.1 | 0.1 |

Figure 10:
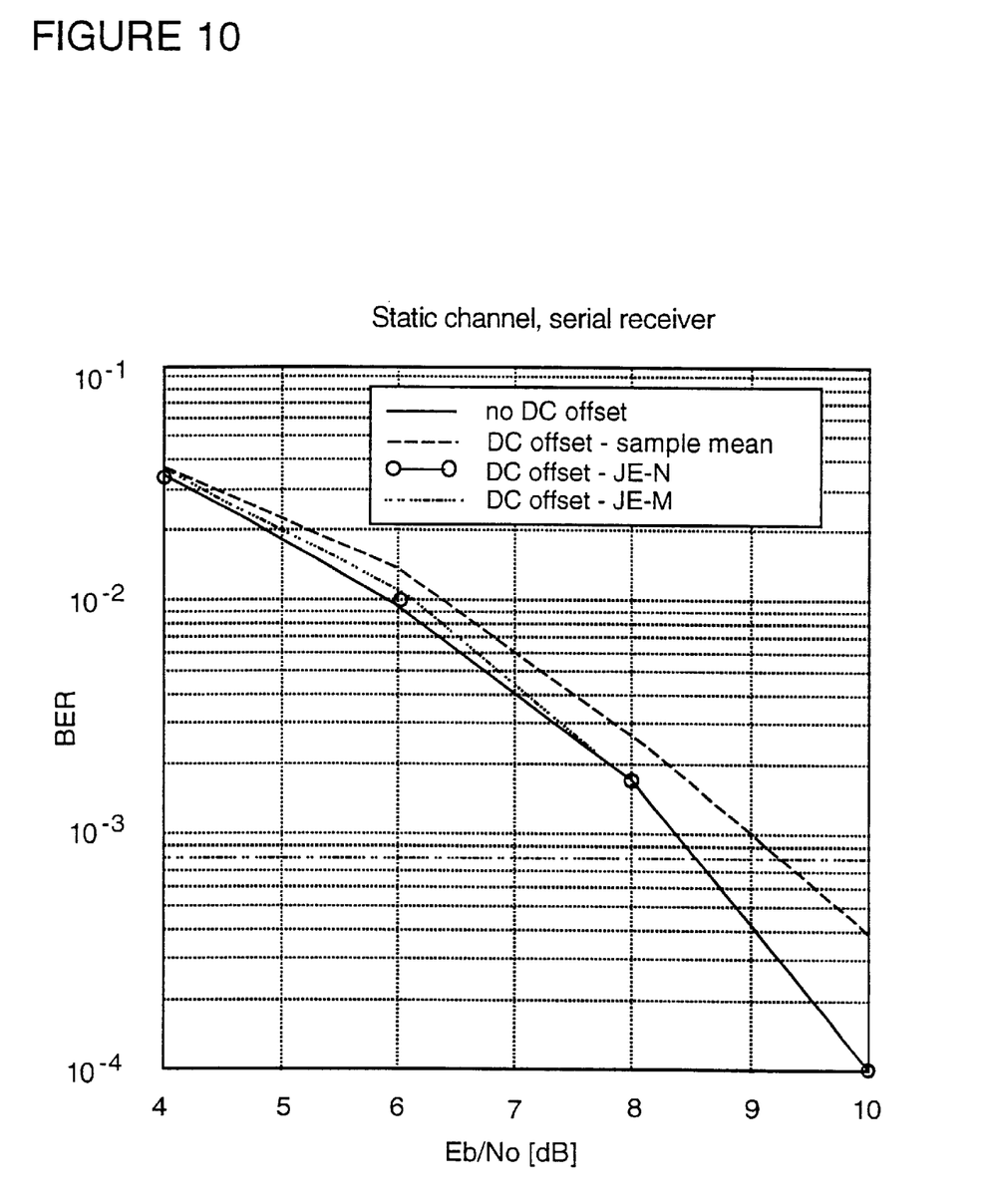
FIG. 10 shows bit error rate (BER) as a function of Energy per bit/Noise density, (Eb/No), for no DC offset compensation, a compensation according to the PRIOR ART method, and in accordance with the invention over both the whole burst N (JE-N) and over the mid-amble portion of the burst M (JE-M).

To quantify the impact on BER, Matlab simulations have been carried out for the static channel and summarized in FIG. 10.

A few assumptions have been made, as follows:

1. The DC offset had random value up to 50 dB above the modulated signal with uniform distribution;
2. The DC offset was constant during the burst duration; and
3. The joint estimation technique has assumed the least complex implementation (i.e. single iteration for least-squares solution):
   (a) An initial DC estimate by averaging over the burst
   (b) A calculation of a 5-tap Channel Impulse Response (CIR) after initial DC subtraction
   (c) A modification of the DC estimate by subtracting the modulated signal is obtained by passing data bits from the entire burst (no errors in decision) through estimated CIR and averaging over the burst afterwards; and
   (d) A final Channel Impulse Response (CIR) estimation for the data receiver 34 is made after subtracting the DC estimate from the received signal.

As shown in FIG. 10, the joint DC offset compensation performed over the entire burst length N (JE-N) has the potential of completely eliminating the performance degradation due to residual DC offset introduced by sample mean estimator. Performing the joint estimation over midamble length (JE-M) results in a loss of the order of 0.1 dB for SNR less than 8 dB, and no less for SNR larger than 8 dB.

Other embodiments are within the spirit and scope of the appended claims. For example, while the invention has been described above for reducing DC offsets in a direct conversion receiver, the invention may be used with other types of receivers, such as heterodyne receivers. Further, the invention may be used with systems other then GSM.

What is claimed is:

1. A communication system wherein information is transmitted through a channel having a discrete channel impulse response h(k), where k is a time index, to produce at an output of the channel, a signal, r(k), where:

$$r(k) = A + \sum_n b(n)h(k-n) + N(k)$$

where:

A is DC offset;

$$\sum_n b(n)h(k-n)$$

is a modulated signal transmitted over the channel;

b(n) are transmitted data symbols; and

N(k) is additive noise. such system comprising:
    a receiver for receiving the transmitted information, such receiver having a processor programmed to solve the following equations simultaneously:

$$\frac{\partial f(e(k))}{\partial \hat{A}} = 0$$

$$\frac{\partial f(e(k))}{\partial \hat{h}} = 0$$

where:
    f(e(k)) is a function of the estimation error quadratic, e(k), where $$e(k) = r(k) - \hat{A} - \sum_n [b(n)\hat{h}(k-n)].$$

2. A communication system wherein information is transmitted through a channel as a series of bursts, each burst having a predetermined series of bits and a series of information bits, such system comprising:

a receiver for receiving the transmitted information, such receiving having a processor programmed to simultaneously solve the following equations from: (a) the predetermined series of bits; (b) a tentative decision of the information bits; or, a combination of the predetermined series of bits and the tentative decision of the information bits:

$$\frac{\partial f(e(k))}{\partial \hat{A}} = 0$$

$$\frac{\partial f(e(k))}{\partial \hat{h}} = 0$$

where:

f(e(k)) is a function of the estimation error, e(k), where e(k) is the difference between the received signal and an estimate of the received signal;

$$e(k) = r(k) - \hat{A} - \sum_n [b(n)\hat{h}(k-n)].$$

3. A method for reducing DC offset from a receiver signal, comprising:

storing received burst samples, r(k) in a memory;
simultaneously computing:

$$A_0 = E\{r(k) - \vec{h}_0^H \vec{b}(k)\}$$

$$\vec{h}_0 = E\{\vec{b}(k)\vec{b}^H(k)\}^{-1} E\{\vec{b}(k)[r(k) - A_0]^*\}$$

to compute a DC of fset, $A_0$, and the channel impulse response, $\vec{h}_0$.

4. A method for determining DC offset in a receiver, comprising:

receiving burst of samples, r(n);
storing the received burst samples, r(n) in a memory;

calculating an initial DC offset, A(0), from the stored received samples as the average value over the burst of samples;

subtracting the initial DC offset, A(0), from the stored received burst to produce r(n)–A(0);

calculating an error function, e(n)=r(n)–$\vec{h}^H$(n) $\vec{b}$(n)–A(n);

updating the DC offset value, A(n+1)=A(n)+$\mu$e(n);

updating a channel impulse response in accordance with $\vec{h}$(n+1)=$\vec{h}$(n)+$\mu\vec{b}$(n)e*(n);

computing the computed DC offset A(n+1) and channel impulse response $\vec{h}$(n+1) until the end of the burst.

5. A method for determining DC offset in a receiver, such receiver receiving a burst comprising a known series of bits and information bits, such receiver comprising:

storing the received burst samples, r(k), in a memory;

calculating an initial DC offset, A(0), from the stored received samples as the average value over the burst;

subtracting the initial DC offset, A(0), is subtracted from the stored received burst;

updating a channel impulse response $$\vec{h}(n+1) = \frac{1}{M} \sum_{k=1}^{M} \vec{b}(k) [r(k) - A(n)]^*$$

updating a DC offset value over a from the known series of bits in the stored received samples, or over the entire burst, in accordance with:

$$A(n+1) = \frac{1}{M} \sum_{k=1}^{M} [r(k) - \vec{h}(n+1)^H \vec{b}(k)]$$

making a determination as to whether a required iterations, P, has been performed and, if not, the method continues to update the estimated channel impulse response and DC offset values; and if it has been performed, the computed DC offset and channel impulse response processed by the receiver.

* * * * *